United States Patent
Pleskot

(10) Patent No.: US 10,596,928 B2
(45) Date of Patent: Mar. 24, 2020

(54) SEAT FRAME FOR A HEIGHT-ADJUSTABLE AND TILTABLE SEAT PAN

(71) Applicant: GM GLOBAL TECHNOLOGY OPERATIONS LLC, Detroit, MI (US)

(72) Inventor: Andrzej Pleskot, Ruesselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/638,023

(22) Filed: Jun. 29, 2017

(65) Prior Publication Data

US 2018/0001793 A1 Jan. 4, 2018

(30) Foreign Application Priority Data

Jun. 29, 2016 (DE) ............. 10 2016 007 870

(51) Int. Cl.
*B60N 2/16* (2006.01)
*B60N 2/10* (2006.01)
*B60N 2/12* (2006.01)

(52) U.S. Cl.
CPC ............ *B60N 2/161* (2013.01); *B60N 2/10* (2013.01); *B60N 2/12* (2013.01); *B60N 2/164* (2013.01); *B60N 2/1695* (2013.01); *B60N 2/16* (2013.01)

(58) Field of Classification Search
CPC . B60N 2/161; B60N 2/10; B60N 2/12; B60N 2/164; B60N 2/1695; B60N 2/16
See application file for complete search history.

(56) References Cited

U.S. PATENT DOCUMENTS

| | | | |
|---|---|---|---|
| 5,806,824 A * | 9/1998 | Isomura ............... | B60N 2/1803 248/396 |
| 6,021,990 A | 2/2000 | Freund | |
| 7,775,592 B2 | 8/2010 | Becker et al. | |
| 7,780,235 B2 | 8/2010 | Teufel et al. | |
| 7,971,937 B2 * | 7/2011 | Ishii ..................... | B60N 2/0232 297/330 |

(Continued)

FOREIGN PATENT DOCUMENTS

| | | |
|---|---|---|
| CN | 201856665 U | 6/2011 |
| CN | 103895536 A | 7/2014 |
| DE | 4302329 A1 | 8/1994 |

OTHER PUBLICATIONS

German Patent Office, German Search Report for German Application No. 102016007870.7, dated Feb. 23, 2017.

*Primary Examiner* — Philip F Gabler
(74) *Attorney, Agent, or Firm* — Lorenz & Kopf, LLP

(57) ABSTRACT

A seat frame is disclosed for a height-adjustable and tiltable seat pan of a motor vehicle seat. The seat frame has two side rails, a first cross bar, a second cross bar, and a drive unit. The first cross bar is supported in the two side rails and the second cross bar serves to support the seat pan. The second cross bar is mounted so as to be rotatable about fixed first axis in the two side rails. The second cross bar is rotated by the drive unit. The drive unit has an actuating motor and an actuator that is displaceable via the actuating motor and connected to the second cross bar outside the first axis. The drive unit is mounted on the first cross bar and rotatable about a second axis of the first cross bar which is fixed in the two side rails.

20 Claims, 5 Drawing Sheets

(56) References Cited

U.S. PATENT DOCUMENTS

| | | | | |
|---|---|---|---|---|
| 8,172,326 B2* | 5/2012 | Adragna | ............... | B60N 2/1615 |
| | | | | 297/344.15 |
| 8,382,205 B2* | 2/2013 | Teer | ....................... | B60N 2/929 |
| | | | | 297/344.17 |
| 8,888,181 B2* | 11/2014 | Perraut | .................... | B60N 2/23 |
| | | | | 297/284.11 |
| 2006/0108491 A1* | 5/2006 | Behrens | ................. | B60N 2/686 |
| | | | | 248/429 |

* cited by examiner

SEAT FRAME FOR A HEIGHT-ADJUSTABLE AND TILTABLE SEAT PAN

CROSS-REFERENCE TO RELATED APPLICATION

This application claims priority to German Patent Application No. 102016007870.7, filed Jun. 29, 2016, which is incorporated herein by reference in its entirety.

TECHNICAL FIELD

The present disclosure pertains to a seat frame for a height-adjustable and tiltable seat pan of a motor vehicle seat, particularly a vehicle seat in a motor car.

BACKGROUND

Motor vehicle seats are often designed in such a way that a seat part which is supported in a seat pan is adjustable in terms of its position and inclination angle. The motor vehicle seat typically has an adjustment mechanism configured to change the vertical position and therewith also to adjust the height of the seat part and to change the inclination angle of the seat part. The horizontal position of the seat part can often be changed as well. The seat pan is typically supported in a seat frame. The seat frame includes the adjustment mechanism for changing the positon and the inclination angle of the seat part.

The seat pan inclination angle is usually changed by an electric drive unit connected to a side rail of the seat frame and to a rotatably mounted cross bar. When the drive unit is actuated, the cross bar is rotated, causing the inclination angle of the seat pan mounted in the cross bar to change relative to the side rails, and consequently also relative to a horizontal plane of the vehicle. For example, a device for adjusting an inclination angle of a seat part in which an actuating motor of the drive unit is supported so as to be rotatable in one of the side rails by a retaining clamp is described in CN103895536A.

SUMMARY

In accordance with the present disclosure a seat frame is provided for a height-adjustable and tiltable seat pan. The adjustability of the seat pan inclination angle is realized with a very small number of components and requiring very little installation space in the seat frame. The seat frame serves to support a seat pan of a motor vehicle seat, wherein the height and inclination angle of the seat pan are adjustable by the seat frame.

The seat frame has two side rails, a first cross bar, a second cross bar and a drive unit. The first cross bar is supported in the two side rails, and the second cross bar serves as a support for the seat pan. The second cross bar is mounted in the two side rails so as to be rotatable about a fixed first axis. Since the seat pan is supportable in the second cross bar, the rotation of the second cross bar enables the inclination angle of the seat pan to be adjusted.

The second cross bars is rotated by the drive unit. The drive unit is equipped with an actuating motor and an actuator that is displaceable via the actuating motor. The actuator is connected to the second cross bar outside of the first axis. In turn, the drive unit is mounted on the first cross bar so as to be rotatable about a second axis of the first cross bar which is fixed in the two side rails. The rotatable mounting of the drive unit on the first cross bar renders an additional retaining bracket unnecessary, so that both the weight of the seat frame and the installation of the drive unit are simplified. Moreover, no additional components need to be provided in the side rails or in one of the side rails to support the drive unit or the retaining clamp for the drive unit.

Since the drive unit bearing is rotatable about the second axis, a displacement of the actuator and the resulting rotation of the second cross bar and the actuator about the first axis fixed in the two side rails necessarily causes the drive unit to rotate correspondingly about the second axis fixed in the two side rails. Preferably, the first cross bar is mounted non-rotatably in the two side rails, and the drive unit is mounted rotatably on the first cross bar. However, the drive unit may be connected in fixed manner to the first cross bar wherein the ability of the drive unit to rotate about the fixed second axis is ensured by mounting the first cross bar in the two side rails in such manner that it can rotate about the second axis.

In a preferred embodiment of the present disclosure, the first cross bar is mounted rotatably about a third axis. In this context, it is entirely conceivable that the third axis is displaceable in a longitudinal direction of the motor vehicle. The mounting of the first cross bar such that it is rotatable about the third axis enables height adjustment of the first cross bar and therewith also height adjustment of the side rails and consequently of the seat pan as well. The first cross bar and/or the second cross bar preferably has/have the form of a tube or rod, more preferably a tube or rod with a circular cross section.

In an advantageous development of the seat frame, the drive unit is supported rotatably on the first cross bar by a bracket which is connected to the drive unit and surrounds the first cross bar, preferably surrounds that first cross bar in positive locking manner. This enables the drive unit to be installed on the first cross bar particularly simply and quickly. In this context, it is provided in particular that the seat frame has a fastener, particularly exactly one fastener, in the form of a threaded fastener such as a screw or bolt. The fastener passes through the drive unit and/or the bracket. In particular, it is provided that the fastener is in the form of a threaded fastener which engages in an interior thread conformed in the bracket or the drive unit. Particularly the use of only one fastener is beneficial in terms of the weight and assembly work.

The use of a bracket to make the connection makes it possible to adjust the resistance of the drive unit to a rotation of the drive unit about the first cross bar easily, simply by changing the contact pressure of the bracket on the first cross bar, by changing the distance by which the fastener in the form a screw is screwed in. In particular, the bearing pressure of the bracket may be selected such that the drive unit is rotatable about the first cross bar, but the drive unit cannot be displaced in a longitudinal direction of the first cross bar.

In order to make it easier for the drive unit to rotate when a bracket is used, in a further embodiment of the seat frame a lubricant, a grease for example, is applied between the bracket and the first cross bar. However, it is also entirely conceivable for the rotatable support to be in the form of a bearing, particularly a bearing designed as a roller bearing. The drive unit preferably bears on the first cross bar in positive locking manner. This prevents the drive unit from tilting in the longitudinal direction of the first cross bar.

In order to prevent the drive unit from shifting in the longitudinal direction of the first cross bar, in a preferred embodiment of the seat frame the cross bar is equipped with an end stop, particularly two end stops for the drive unit arranged at a distance from each other in a longitudinal direction of the first cross bar. The end stop preferably has the form of a circumferential bead.

In an advantageous development of the seat frame, the actuating motor is designed as an electric motor, preferably a linear motor, particularly a spindle motor.

The drive unit preferably includes a spindle rod, the actuator being arranged on the spindle rod. In such case, it is considered advantageous if the drive unit has at least on travel limiter for the actuator, in particular that the travel limiter closest to the actuating motor is in the form of a sleeve surrounding the spindle rod.

In a particularly preferred embodiment, the actuator movement takes place along a straight line, which intersects the second axis. The straight line preferably intersects the second axis at right angles. In this way, it is ensured that the largest possible part of the actuator's movement along the straight line is transformed into a rotary movement of the second cross bar. The straight line is preferably formed by a longitudinal axis of the spindle rod.

It is considered beneficial to the present purposes if the actuator is supported in a bearing section that is connected to the second cross bar, preferably that the actuator is supported rotatably and/or displaceably in the bearing section. In this context, it is considered advantageous if a connection to the actuator clasps behind the bearing section on the side facing away from the actuator. This represents a simple way to ensure a rotatable and/or displaceable support for the actuator in the bearing section.

It is considered particularly advantageous if the seat frame is mounted so as to be displaceable in a longitudinal direction of the motor vehicle, preferably displaceable in a seat rail system.

It is considered advantageous if two pivot legs are connected to each of the first cross bar and/or the second cross bar.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
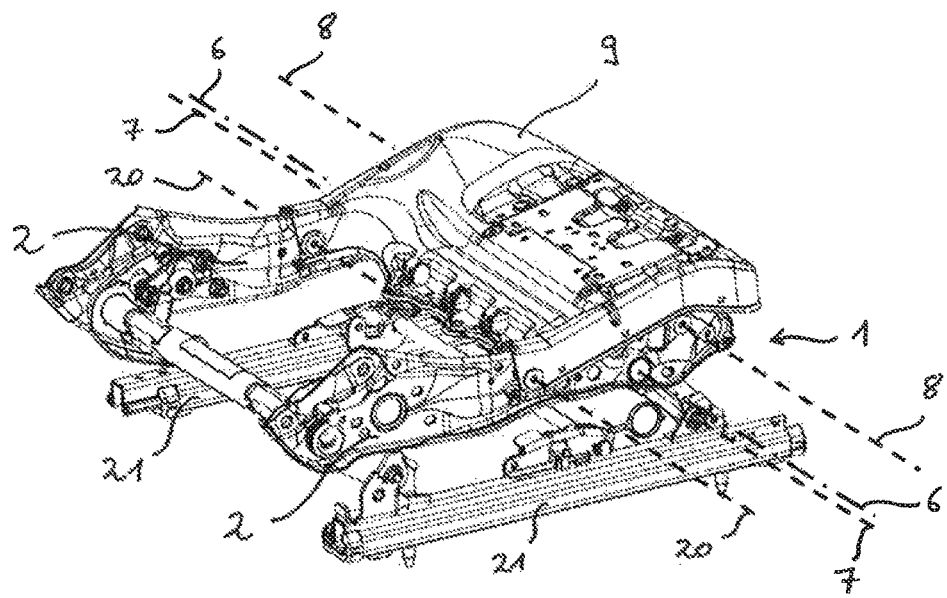
FIG. 1 is a perspective view of an arrangement of a seat frame with a seat pan supported in the seat frame.
Figure 2:
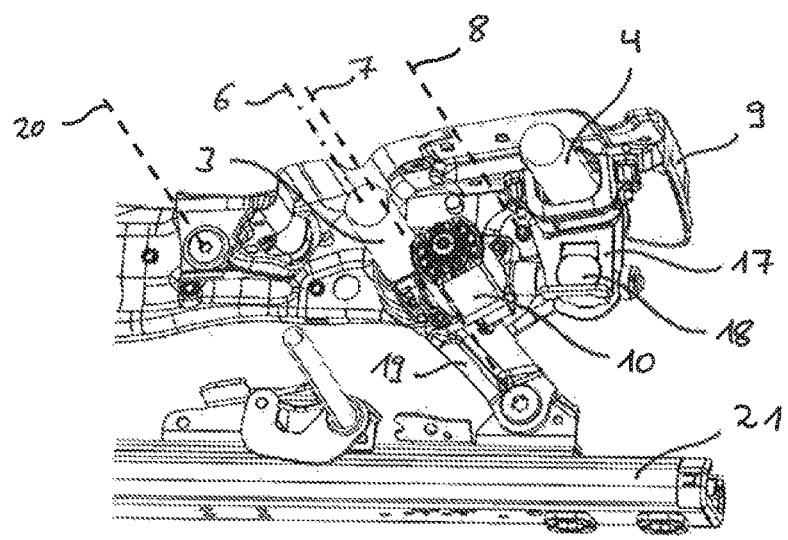
FIG. 2 is a perspective view of part of the arrangement according to FIG. 1.
Figure 3:
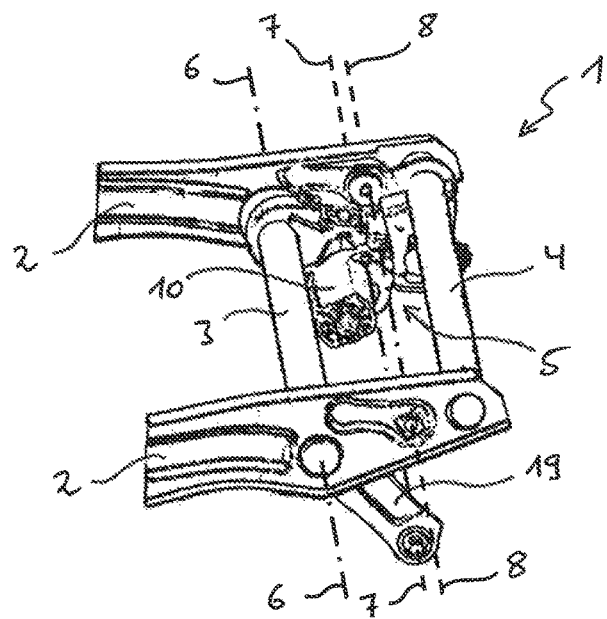
FIG. 3 is a perspective view of the seat frame according to FIG. 1.
Figure 4:
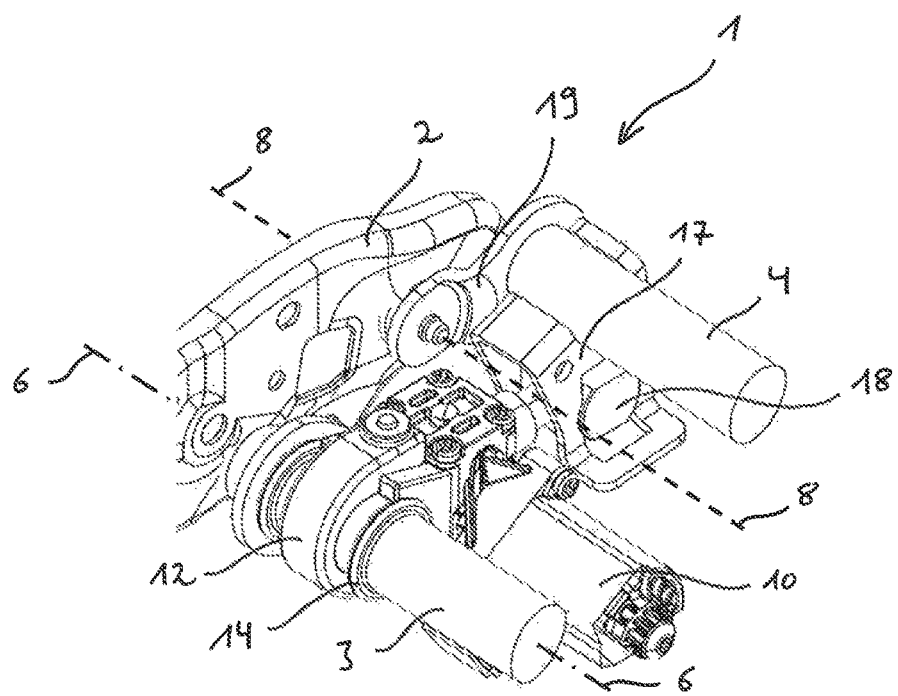
FIG. 4 is a perspective view of part of the seat frame according to FIG. 1.

FIG. 1 shows a seat frame 1 with a seat pan 9 supported in seat frame 1, wherein seat frame 1 is mounted displaceably in a seat rail system 21 having two seat rails. Seat frame 1 has two side rails 2, a first cross bar 3 and a second cross bar. Seat pan 9 is mounted at one end in second cross bar 4 and at the other end in the two side rails 2 so as to be rotatable about a fourth axis 20.

Second cross bar 4 is in turn mounted rotatably about a first axis 8 which is fixed in the two side rails 2. Rotation of the second cross bar 4 causes seat pan 9 to rotate about fourth axis 20 and thus change the inclination angle of seat pan 9 relative to the two side rails 2 and consequently relative to a horizontal plane of the vehicle. The second cross bar 4 is rotated by a drive unit 5, the drive unit 5 having an actuating motor 10 and an actuator 11 which is displaceable by the actuating motor 10. Drive unit 5 is in the form of a spindle motor. Actuator 11 is arranged on a spindle rod 15 of drive unit 5. Actuator 11 is mounted rotatably in a bearing section 17 connected to the second cross bar 4. A connection 18 connected to actuator 11 engages behind bearing section 17 on the side thereof facing away from actuator 11.

Drive unit 5 is mounted on first cross bar 3 so as to be rotatable about a second axis 6 of the first cross bar 3 which is fixed in the two side rails 2. Since drive unit 5 is mounted rotatably on first cross bar 3, and first axis 8 and second axis 6 are fixed, cross bar 4 is rotatable about the first axis 8 and thus alters the inclination angle of seat pan 9 by displacement of actuator 11 relative to the two side rails 2.

First cross bar 3 is mounted non-rotatably in the two side rails 2 and rotatably about a third axis 7 on the side of the seat rail system. First cross bar 3 is connected to seat rail system 21 by two pivot legs 19 which are pivotable relative to the seat rails, first cross bar 3 being mounted rotatably in the two pivot legs 19. Height adjustment of seat pan 9 is achieved by pivoting of the two pivot legs 19 and the rotation of first cross bar 3 resulting therefrom.

As may be seen particularly in FIGS. 3-8, drive unit 5 is mounted flush in positive locking manner on first cross bar 3, drive unit 5 being mounted rotatably on first cross bar 3 by a bracket 12 which surrounds the first cross bar 3 in positive locking manner. An end stop 14 in the form of a bead extending circumferentially around first cross bar 3 prevents drive unit 5 from shifting in a longitudinal direction of first cross bar 3.

Figure 6:
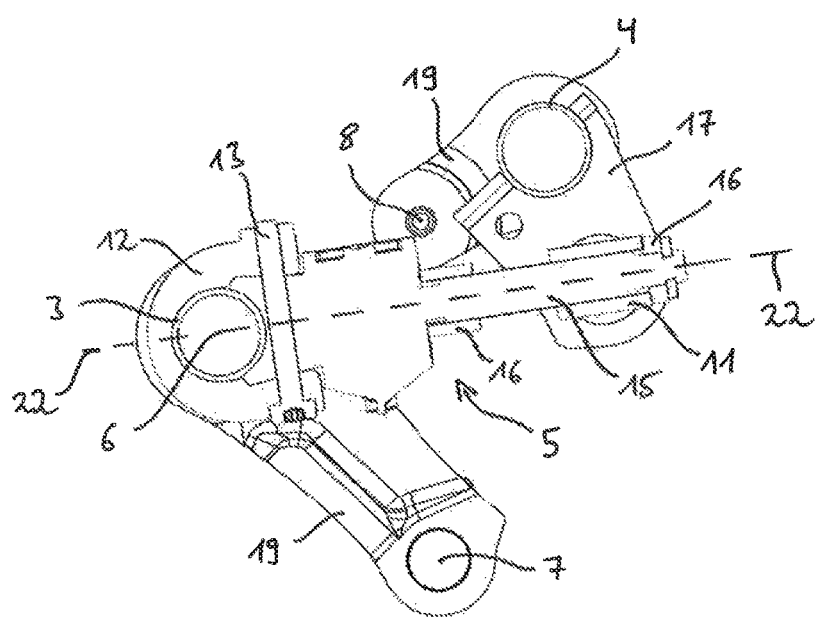
FIG. 6 is a cross sectional view of the seat frame according to FIG. 1 without the side rails and in a first end position of a seat pan inclination angle in a longitudinal direction of the seat frame.
Figure 7:
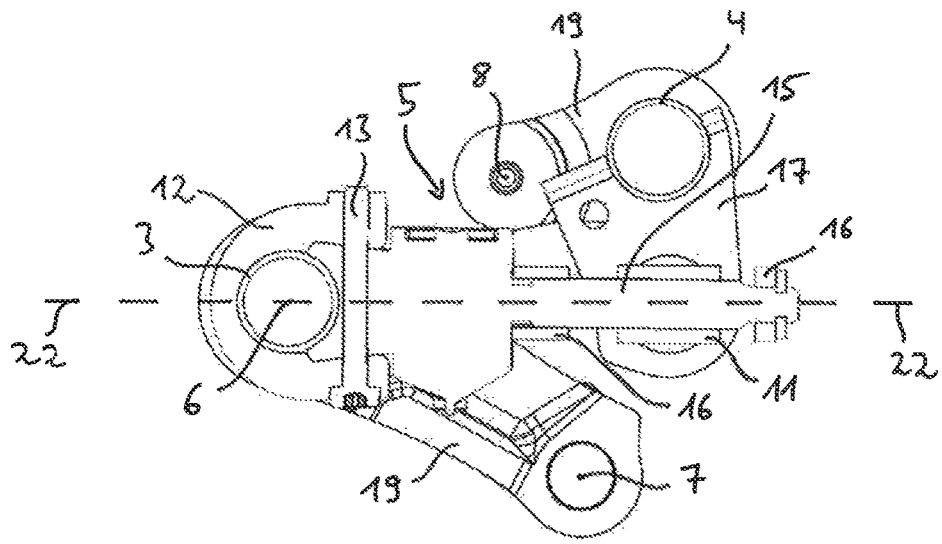
FIG. 7 shows the same view as in FIG. 6 of the seat frame of FIG. 6 with the seat pan in an intermediate inclination angle position.
Figure 8:
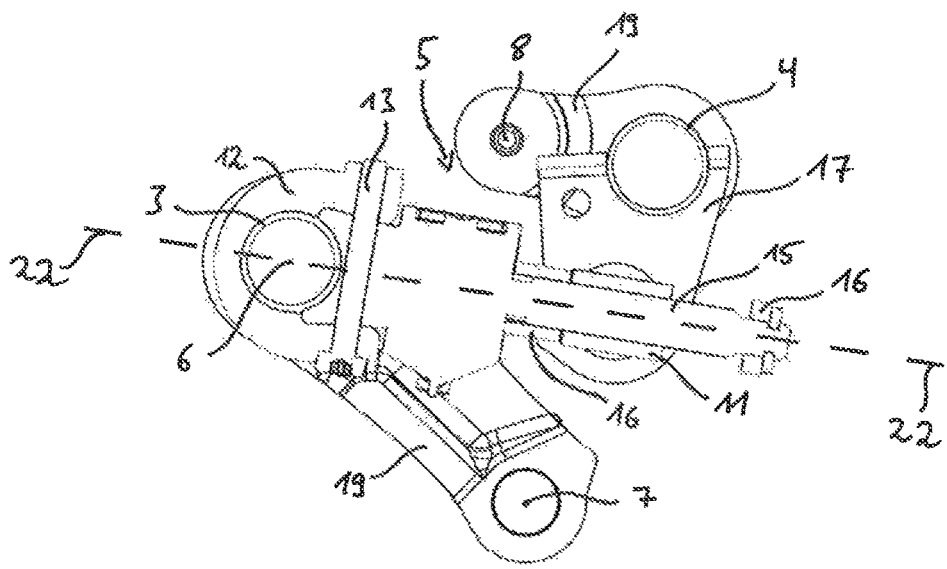
FIG. 8 shows the same view as in FIG. 6 of the seat frame of FIG. 6 with the seat pan in second end position of a seat pan inclination angle.
Figure 9:
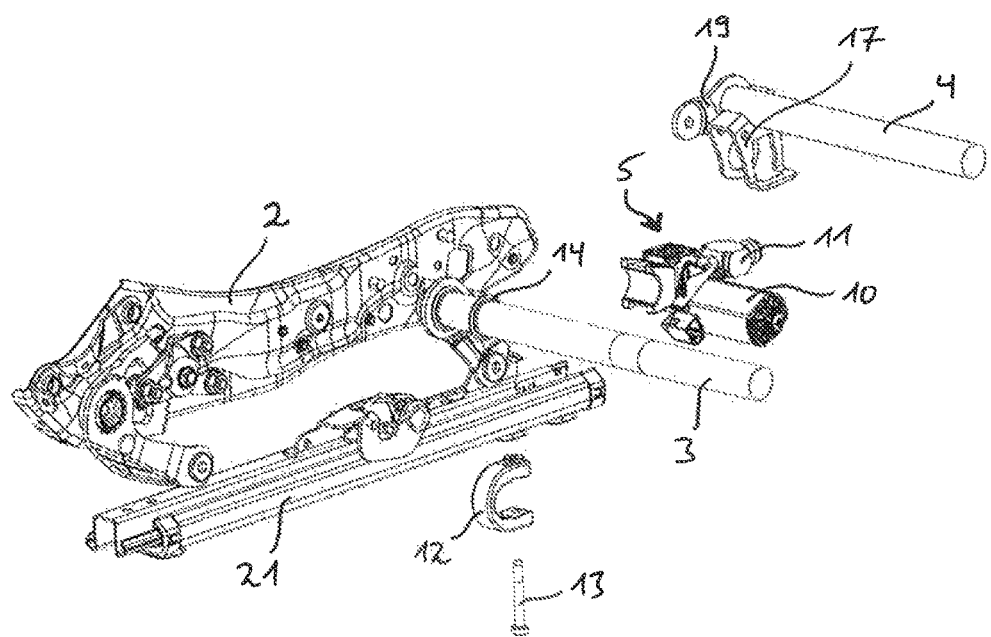
FIG. 9 is a perspective exploded view of a partial area of the seat frame according to FIG. 1.

As may be seen particularly in the cross sections of FIGS. 6-8, a fastener 13 in the form of a threaded fastener passes through drive unit 5 and bracket 12. The fastener 13 engages in an internal thread conformed in bracket 12. A more or less torsionally resistant connection between drive unit 5 and first cross bar 3 may be created according to a tightening torque of the screw, providing a simple way to adjust the resistance of the drive unit to rotation.

Figure 5:
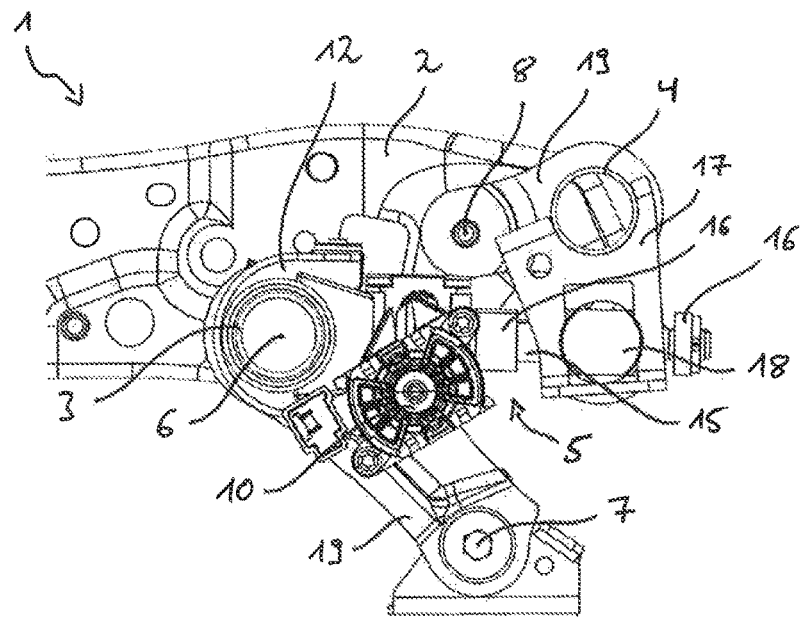
FIG. 5 is a cross sectional view of the seat frame according to FIG. 1 in a longitudinal direction of the seat frame.

FIGS. 5-8 show seat frame 1 in various positions, wherein different inclination angles as well as different height positions are illustrated. In this context, FIG. 5 shows for exemplary purposes a side view of seat frame 1 with side rail 2. For the sake of clarity, side rail 2 and the attachment to seat part rail system 21 of the pivot leg 19 which is connected to first cross bar 3 have been omitted from FIGS. 6-8.

FIGS. 5, 6 and 8 show seat frame 1 in exactly the same height position. FIG. 7 shows seat frame 1 in a lower height position than in FIGS. 5, 6 and 8. The seat frame has been lowered by a rotation of first cross bar 3 about the third axis of rotation 7 in the direction of seat rail system 21.

FIG. 6 shows seat frame 1 in a first end position of the seat pan inclination angle. This first end position is characterized in that actuator 11 is located in a position as far as possible from second axis 6. In this case, actuator 11 bears on a travel limiter 16 arranged on the end of spindle rod 15 to limit the travel path of actuator 16. This first end position of the seat pan inclination angle corresponds to a maximum inclination angle of seat pan 9.

FIG. 8 shows seat frame 1 in a second end position of the seat pan inclination angle, this end position being characterized in that actuator 11 lies flush against a travel limiter 16 on the actuating motor side. The travel limiter 16 is configured as the sleeve that surrounds spindle rod 15. This end position corresponds to a minimum inclination angle of seat pan 9.

In FIGS. 5 and 7, actuator 11 is located in an intermediate position between the two end positions. Consequently, the seat pan inclination angle is also in an intermediate position between the two extremes.

The rotatable mounting of drive unit 5 on first cross bar 3 ensures that an adjustment of the height of seat pan 9 does not affect the inclination angle setting of seat pan 9. This is shown particularly by a comparison of FIG. 5 with FIG. 7.

As may be seen particularly in FIGS. 6 to 8, a longitudinal axis 22 of spindle rod 15 intersects second axis 6, thereby ensuring that the movement of actuator 11 does not cause drive unit 5 to rotate immediately and consequently ensures that the largest possible portion of the displacement movement of actuator 11 is transformed into a rotation movement of second cross bar 4.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A seat frame for a height-adjustable and tiltable seat of a motor vehicle seat comprising:
   a seat rail system that is configured to attach to a floor of a vehicle;
   two side rails that are attached to the seat rail system and that are supported for movement relative to the seat rail system;
   a first cross bar that extends along a first axis and that is attached to the two side rails;
   a second cross bar supported by the two side rails and supported for rotation relative to the two side rails about a second axis, the second axis being fixed relative to the two side rails;
   a seat pan that is supported by the second cross bar and that is pivotally attached to the two side rails for changing an inclination angle of the seat pan relative to the two side rails; and
   a drive unit connected to the first cross bar and the second cross bar, the drive unit supported for rotation about the first axis of the first cross bar, the first axis being fixed relative to the two side rails, the drive unit having an actuating motor and an actuator connected to the second cross bar, wherein the actuator is displaceable by the actuating motor to rotate the second cross bar about the second axis and thereby change the inclination angle of the seat pan relative to the two side rails.

2. The seat frame according to claim 1, wherein the first cross bar is supported for rotation relative to the seat rail system about a third axis.

3. The seat frame according to claim 2, wherein the first cross bar is fixed to the two side rails and is supported for rotation about the third axis to change a vertical height of the seat pan relative to the seat rail system.

4. The seat frame according to claim 3, further comprising a pivot leg that is attached to the seat rail system and the first cross bar, the pivot leg rotatable about the third axis to change a vertical height of the seat pan relative to the seat rail system.

5. The seat frame according to claim 2, further comprising a bracket that surrounds the first cross bar and that is connected to the drive unit, the bracket being rotatable about the first cross bar.

6. The seat frame according to claim 5, further comprising a threaded fastener that passes through at least one of the drive unit or the bracket and that engages an internal thread of the at least one of the drive unit or the bracket.

7. The seat frame according to claim 5, further comprising an anti-friction element between the bracket and the first cross bar, the anti-friction element selected from a group consisting of a lubricant, a bearing, a roller bearing and a combination thereof.

8. The seat frame according to claim 1, wherein the first cross bar comprises at least one end stop for the drive unit arranged in a longitudinal direction of the first cross bar.

9. The seat frame according to claim 8, wherein the end stop comprises a circumferential bead formed on the first cross bar.

10. The seat frame according to claim 8, wherein the first cross bar comprises two end stops for the drive unit arranged at a distance from each other in the longitudinal direction of the first cross bar.

11. The seat frame according to claim 10, wherein the end stops each comprise a circumferential bead formed on the first cross bar.

12. The seat frame according to claim 1, wherein the actuating motor is selected from a group consisting of an electric motor, a linear motor, and a spindle motor.

13. The seat frame according to claim 1, wherein the drive unit comprises a spindle rod, wherein the actuator is arranged on the spindle rod.

14. The seat frame according to claim 13, wherein the drive unit further comprises at least one travel limiter for the actuator.

15. The seat frame according to claim 14, wherein a travel limiter closest to the actuating motor comprises a sleeve surrounding the spindle rod.

16. The seat frame according to claim 13, wherein the displacement movement of the actuator takes place along a longitudinal axis of the spindle rod, the longitudinal axis of the spindle rod intersecting the first axis at right angles.

17. The seat frame according to claim 1, further comprising a bearing section that is connected to the second cross bar and the actuator, wherein the actuator is displaceably mounted to the bearing section.

18. The seat frame according to claim 17, further comprising a connection between the actuator and the bearing section that is disposed on a side of the bearing section facing away from the actuator.

19. The seat frame according to claim 1, further comprising a pivot leg that is attached to the second cross bar and that is attached to one of the two side rails at the second axis.

20. A seat frame for a height-adjustable and tiltable seat of a motor vehicle seat comprising:
- a first seat rail and a second seat rail configured to fixedly attach to a support structure of a vehicle;
- a first side rail and a second side rail;
- a first cross bar that extends along a first axis and that is fixed to the first side rail and the second side rail, the first axis being fixed relative to the first side rail;
- a first pivot leg that is attached to at least one of the first side rail and the first cross bar, the first pivot leg being pivotally attached to the first seat rail at a height-adjustment axis, the first pivot leg being configured for rotation about the height-adjustment axis to vary a height of the first side rail relative to the first seat rail;
- a second cross bar that extends between the first side rail and the second side rail;
- a second pivot leg that is attached to the second cross bar and to the first side rail, the second pivot leg being attached to the first side rail at a second axis, the second axis being fixed relative to the first side rail;
- a seat pan that is supported by the second cross bar and that is pivotally attached to the first and second side rails for changing an inclination angle of the seat pan relative to the first and second side rails; and
- a linear drive unit connected to the first cross bar and the second cross bar, the linear drive unit supported for rotation about the first axis of the first cross bar, the linear drive unit having an actuating motor and an actuator connected to the second cross bar, wherein the actuator is displaceable by the actuating motor along a straight third axis to rotate the second cross bar about the second axis and thereby change the inclination angle of the seat pan, the third axis intersecting the first axis and extending normal to the first axis.

* * * * *